United States Patent
Alavi et al.

(10) Patent No.: US 12,452,384 B2
(45) Date of Patent: *Oct. 21, 2025

(54) USER INTERFACE FOR POSE DRIVEN VIRTUAL EFFECTS

(71) Applicant: Snap Inc., Santa Monica, CA (US)

(72) Inventors: Amir Alavi, Los Angeles, CA (US); Olha Rykhliuk, Marina Del Rey, CA (US); Xintong Shi, Los Angeles, CA (US); Jonathan Solichin, Arcadia, CA (US); Olesia Voronova, Santa Monica, CA (US); Artem Yagodin, Playa del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,255

(22) Filed: Nov. 27, 2023

(65) Prior Publication Data

US 2024/0098211 A1 Mar. 21, 2024

Related U.S. Application Data

(63) Continuation of application No. 17/445,043, filed on Aug. 13, 2021, now Pat. No. 11,832,015.

(Continued)

(51) Int. Cl.
*H04N 5/262* (2006.01)
*G06F 3/01* (2006.01)
(Continued)

(52) U.S. Cl.
CPC ........... *H04N 5/2621* (2013.01); *G06F 3/017* (2013.01); *G06T 7/251* (2017.01); *G06T 11/00* (2013.01);
(Continued)

(58) Field of Classification Search
CPC .. H04N 5/2621; H04N 23/611; H04N 23/631; H04N 23/64; G06F 3/017;
(Continued)

(56) References Cited

U.S. PATENT DOCUMENTS 5,754,939 A 5/1998 Herz et al.
6,038,295 A 3/2000 Mattes
(Continued)

FOREIGN PATENT DOCUMENTS

CA 2887596 A1 7/2015
CN 102413885 A 4/2012
(Continued)

OTHER PUBLICATIONS

"U.S. Appl. No. 17/363,835, Corrected Notice of Allowability mailed Apr. 25, 2024", 4 pgs.
(Continued)

*Primary Examiner* — Lin Ye
*Assistant Examiner* — Tuan H Le
(74) *Attorney, Agent, or Firm* — Schwegman Lundberg & Woessner, P.A.

(57) ABSTRACT

Systems and methods herein describe a method for capturing a video in real-time by an image capture device. The system provides a plurality of visual pose hints, identifies first pose information in the video while capturing the video, applies a first series of virtual effects to the video, identifies second pose information, and applies a second series of virtual effects to the video, the second series of virtual effects based on the first series of virtual effects.

20 Claims, 21 Drawing Sheets

Related U.S. Application Data

(60) Provisional application No. 62/706,391, filed on Aug. 13, 2020.

(51) Int. Cl.

| | | |
|---|---|---|
| *G06T 7/246* | (2017.01) | |
| *G06T 11/00* | (2006.01) | |
| *G06V 40/20* | (2022.01) | |
| *H04N 23/611* | (2023.01) | |
| *H04N 23/63* | (2023.01) | |

(52) U.S. Cl.
CPC ........... *G06V 40/28* (2022.01); *H04N 23/611* (2023.01); *H04N 23/631* (2023.01); *G06T 2207/10016* (2013.01); *G06T 2207/30196* (2013.01)

(58) Field of Classification Search
CPC ............. G06T 7/251; G06T 11/00; G06T 2207/10016; G06T 2207/30196; G06V 40/28; H04L 51/222; H04L 51/10; H04L 51/18
See application file for complete search history.

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 7,971,156 B2 | 6/2011 | Albertson et al. |
| 7,996,793 B2 | 8/2011 | Latta et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,487,938 B2 | 7/2013 | Latta et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,856,691 B2 | 10/2014 | Geisner et al. |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,230,160 B1 | 1/2016 | Kanter |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,102,423 B2 | 10/2018 | Shaburov et al. |
| 10,242,477 B1 | 3/2019 | Charlton et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,422,669 B1 | 8/2022 | Ravasz et al. |
| 11,531,402 B1 | 12/2022 | Stolzenberg |
| 11,546,505 B2 | 1/2023 | Canberk |
| 11,832,015 B2 * | 11/2023 | Alavi .................... G06T 7/251 |
| 11,991,469 B2 | 5/2024 | Rykhliuk et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |

(56) References Cited

U.S. PATENT DOCUMENTS

| | | |
|---|---|---|
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0012788 A1 | 1/2009 | Gilbert et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0301934 A1 | 12/2011 | Tardif |
| 2011/0320373 A1 | 12/2011 | Lee et al. |
| 2012/0028659 A1 | 2/2012 | Whitney et al. |
| 2012/0162409 A1 | 6/2012 | Setiawan et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0171036 A1 | 6/2014 | Simmons |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0120293 A1 | 4/2015 | Wohlert et al. |
| 2015/0138385 A1 | 5/2015 | Kim |
| 2015/0177844 A1 | 6/2015 | Chen |
| 2015/0199082 A1 | 7/2015 | Scholler et al. |
| 2015/0227602 A1 | 8/2015 | Ramu et al. |
| 2015/0370320 A1 | 12/2015 | Connor |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0123487 A1 | 5/2017 | Hazra et al. |
| 2017/0161382 A1 | 6/2017 | Ouimet et al. |
| 2017/0263029 A1 | 9/2017 | Yan et al. |
| 2017/0277684 A1 | 9/2017 | Dharmarajan Mary |
| 2017/0277685 A1 | 9/2017 | Takumi |
| 2017/0287006 A1 | 10/2017 | Azmoodeh et al. |
| 2017/0295250 A1 | 10/2017 | Samaranayake et al. |
| 2017/0351910 A1 | 12/2017 | Elwazer et al. |
| 2017/0374003 A1 | 12/2017 | Allen et al. |
| 2017/0374508 A1 | 12/2017 | Davis et al. |
| 2018/0158370 A1 | 6/2018 | Pryor |
| 2018/0268609 A1 | 9/2018 | Schneider et al. |
| 2019/0113606 A1 | 4/2019 | Mathy et al. |
| 2019/0146653 A1 | 5/2019 | Ikuta et al. |
| 2019/0347860 A1* | 11/2019 | Steiner .................. G06V 20/20 |
| 2020/0074738 A1 | 3/2020 | Hare et al. |
| 2020/0103971 A1 | 4/2020 | Lee et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2021/0409615 A1 | 12/2021 | Rykhliuk et al. |
| 2022/0053146 A1 | 2/2022 | Alavi et al. |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2024/0314262 A1 | 9/2024 | Rykhliuk et al. |

FOREIGN PATENT DOCUMENTS

| | | |
|---|---|---|
| CN | 103828379 A | 5/2014 |
| CN | 103049761 B | 8/2016 |
| CN | 107635104 A | 1/2018 |
| CN | 108921919 A | 11/2018 |
| CN | 109345614 A | 2/2019 |
| CN | 109462776 A | 3/2019 |
| CN | 111107280 A | 5/2020 |
| CN | 116114258 A | 5/2023 |
| CN | 116261850 A | 6/2023 |
| CN | 116261850 B | 10/2024 |
| CN | 119135647 A | 12/2024 |
| EP | 3707693 A1 | 9/2020 |
| KR | 20220158824 A | 12/2022 |
| WO | WO-2011109126 A1 | 9/2011 |
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016168591 A1 | 10/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2019094618 A1 | 5/2019 |
| WO | WO-2022005687 A1 | 1/2022 |
| WO | WO-2022005693 A1 | 1/2022 |
| WO | WO-2022006249 A1 | 1/2022 |
| WO | WO-2022036372 A1 | 2/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"U.S. Appl. No. 17/363,835, Notice of Allowance mailed Jan. 10, 2024", 8 pgs.

"U.S. Appl. No. 17/363,835, Response filed Dec. 11, 2023 to Final Office Action mailed Jul. 10, 2023", 9 pgs.

"U.S. Appl. No. 18/668,951, Non Final Office Action mailed Jan. 31, 2025", 18 pgs.

"Chinese Application Serial No. 202180047149.3, Office Action mailed Mar. 8, 2024", W/English Translation, 15 pgs.

(56) References Cited

OTHER PUBLICATIONS

"Chinese Application Serial No. 202180047149.3, Response filed Jul. 8, 2024 to Office Action mailed Mar. 8, 2024", W/English Claims, 11 pgs.
"Chinese Application Serial No. 202180055726.3, Office Action mailed Oct. 14, 2024", w/English translation, 19 pgs.
"Chinese Application Serial No. 202180055726.3, Response filed Feb. 5, 2025 to Office Action mailed Oct. 14, 2024", W/English Claims, 10 pgs.
"European Application Serial No. 21755111.8, Communication Pursuant to Article 94(3) EPC mailed Jan. 8, 2025", 7 pgs.
"European Application Serial No. 21769611.1, Communication Pursuant to Article 94(3) EPC mailed Feb. 3, 2025", 7 pgs.
Sharma, Greeshma, et al., "Brain connectivity in spatial orientation task", 2016 International Conference on Emerging Trends in Communication Technologies (ETCT), IEEE, (2016), 4 pgs.
"U.S. Appl. No. 18/668,951, Notice of Allowance mailed May 29, 2025", 8 pgs.
"U.S. Appl. No. 18/668,951, Response filed Apr. 30, 2025 to Non Final Office Action mailed Jan. 31, 2025", 7 pgs.
"Chinese Application Serial No. 202180055726.3, Office Action mailed Mar. 17, 2025", w/English translation, 14 pgs.
"U.S. Appl. No. 17/363,835, Final Office Action mailed Jul. 10, 2023", 12 pgs.
"U.S. Appl. No. 17/363,835, Non Final Office Action mailed Dec. 23, 2022", 18 pgs.
"U.S. Appl. No. 17/363,835, Response filed Mar. 23, 2023 to Non Final Office Action mailed Dec. 23, 2022", 8 pgs.
"U.S. Appl. No. 17/445,043, Corrected Notice of Allowability mailed Oct. 30, 2023", 5 pgs.
"U.S. Appl. No. 17/445,043, Non Final Office Action mailed Dec. 23, 2022", 11 pgs.
"U.S. Appl. No. 17/445,043, Notice of Allowance mailed Jul. 7, 2023", 9 pgs.
"U.S. Appl. No. 17/445,043, Response filed Mar. 23, 2023 to Non Final Office Action mailed Dec. 23, 2022", 8 pgs.
"Chinese Application Serial No. 202180047149.3, Office Action mailed Feb. 13, 2023", w/English Machine Translation, 3 pgs.
"European Application Serial No. 21755111.8, Response filed Aug. 18, 2023 to Communication pursuant to Rules 161(1) and 162 EPC mailed Feb. 14, 2023", 33 pgs.
"International Application Serial No. PCT/US2021/039855, International Preliminary Report on Patentability mailed Jan. 12, 2023", 9 pgs.
"International Application Serial No. PCT/US2021/039855, International Search Report mailed Oct. 18, 2021", 5 pgs.
"International Application Serial No. PCT/US2021/039855, Written Opinion mailed Oct. 18, 2021", 7 pgs.
"International Application Serial No. PCT/US2021/071181, International Preliminary Report on Patentability mailed Feb. 23, 2023", 9 pgs.
"International Application Serial No. PCT/US2021/071181, International Search Report mailed Nov. 29, 2021", 5 pgs.
"International Application Serial No. PCT/US2021/071181, Written Opinion mailed Nov. 29, 2021", 7 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Mehta, Dushyant, et al., "VNect: Real-time 3D Human Pose Estimation with a Single RGB Camera", arxiv.org, Cornell University Library, [Online] Retrieved from the internet: <https://vcai.mpi-inf.mpg.de/projects/VNect/>, (May 3, 2017), 14 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: < URL: http://www.eweek.com/print/c/a/MessagingandCollaboration/StealthTextShouldYouChoosetoAcceptIt>, (Dec. 13, 2005), 2 pgs.
U.S. Appl. No. 17/363,835, filed Jun. 30, 2021, Skeletal Tracking for Real-Time Virtual Effects.
U.S. Appl. No. 17/445,043 U.S. Pat. No. 11,832,015, filed Aug. 13, 2021, User Interface for Pose Driven Virtual Effects.
"Korean Application Serial No. 10-2023-7008253, Notice of Preliminary Rejection mailed Jun. 18, 2025", w/ English Translation, 8 pgs.
"Chinese Application Serial No. 202180055726.3, Decision of Rejection mailed Jul. 10, 2025", w/ English Translation, 11 pgs.
"Chinese Application Serial No. 202180055726.3, Response filed Jun. 17, 2025 to Office Action mailed Mar. 17, 2025", w/ English Claims, 10 pgs.
"European Application Serial No. 21755111.8, Response filed Jul. 8, 2025 to Communication Pursuant to Article 94(3) EPC mailed Jan. 8, 2025", 13 pgs.
"European Application Serial No. 21769611.1, Response filed Aug. 4, 2025 to Communication Pursuant to Article 94(3) EPC mailed Feb. 3, 2025", 13 pgs.

\* cited by examiner

```
22  // To add custom pose:
23  //PoseLibrary.MY_CUSTOM_POSE = Message copied from Logger after tapping scenes
24
25  PoseLibrary.ARMS_UP = {"LeftUpperarm":"0.154","LeftForearm":"1.702","RightUpperarm":"-0.169", "RightForearm":"-1.473"};
26
27  PoseLibrary.RIGHT_ARM_L = {"RightUpperarm":"0.074","RightForearm":"-1.747", "Spine":"-0.102"};
28
29  PoseLibrary.TPOSE = {"LeftUpperarm":"0.067","LeftForearm":"0.165","RightUpperarm":"0.124", "RightForearm":"-0.355"};
30
```

USER INTERFACE FOR POSE DRIVEN VIRTUAL EFFECTS

CLAIM OF PRIORITY

This application is a continuation of U.S. patent application Ser. No. 17/445,043, filed Aug. 13, 2021, which claims the benefit of priority to U.S. Provisional Application Ser. No. 62/706,391, filed Apr. 13, 2020, each of which is incorporated herein by reference in its entirety.

BACKGROUND

In many videos today, effects such as screen shake, color correction and more, are added after the video is shot, in a post-process. This is especially popular in dance videos which are subject to repetition by different creators.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIGS. 14-19 are example user interfaces of a skeletal pose system, according to some example embodiments.

DETAILED DESCRIPTION

The proposed systems and methods describe a skeletal pose system that uses a person's movements to drive visual effects, using augmented reality (AR). For example, the skeletal pose system detects a user's pose (e.g., how the user's body is positioned and the angle between each joint) to "trigger" a virtual effect. In another example, the skeletal pose system tracks the user's hand or joint to allow the user to control the level of the virtual effect that they desire. In one example, the skeletal pose system detects a user's hand as it relates to a reference point to trigger a virtual effect (e.g., if the user moves their hand towards the corner of the camera viewfinder, it will trigger the virtual effect). In another example, the skeletal pose system detects hand gestures to trigger the virtual effect. The skeletal pose system may further link multiple virtual effects together as a sequence of effects.

Networked Computing Environment

Figure 1:
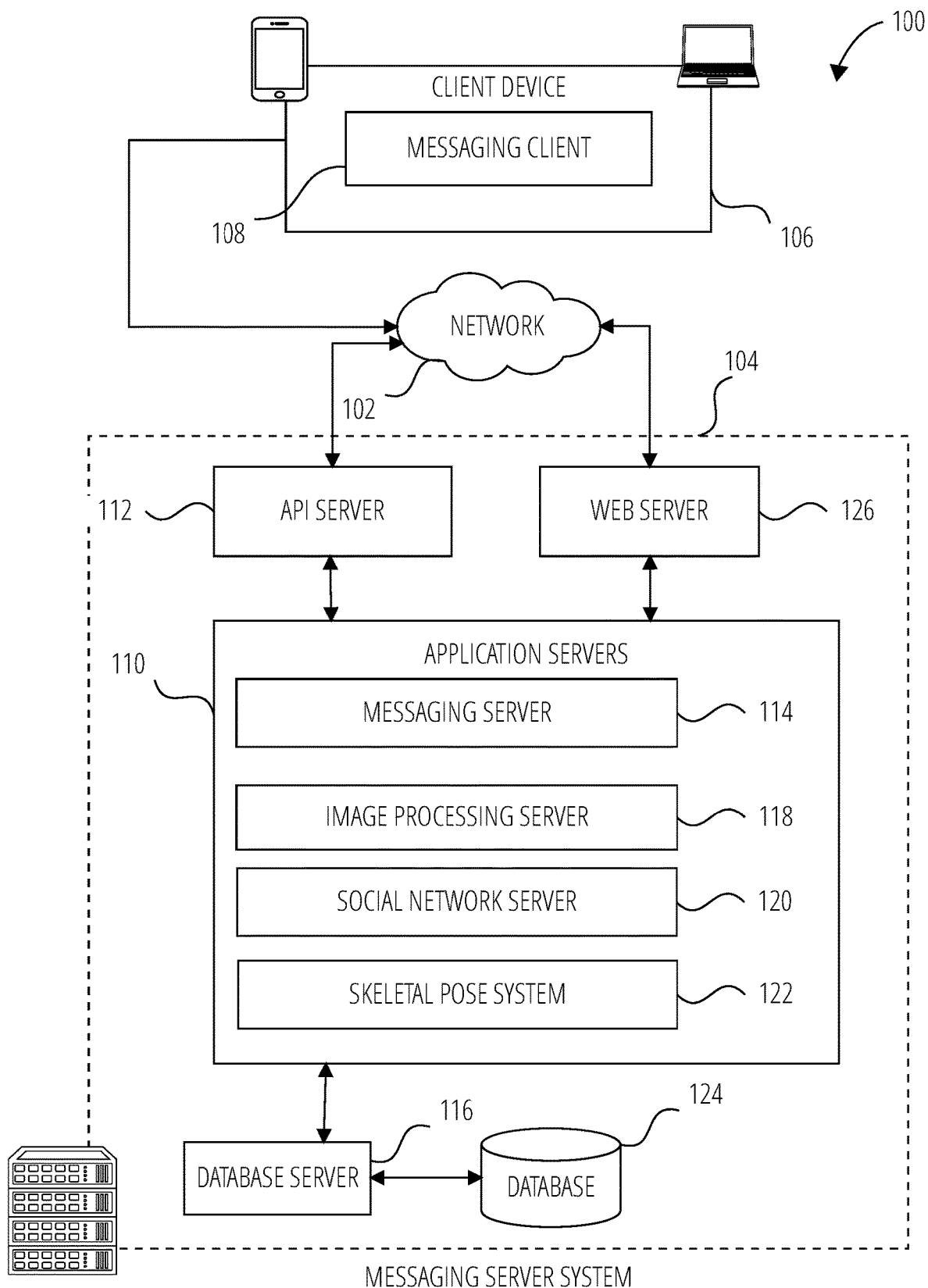
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 124 that stores data associated with messages processed by the application servers 110. Similarly, a web server 126 is coupled to the application servers 110, and provides web-based interfaces to the application servers 110. To this end, the web server 126 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

Figure 3:
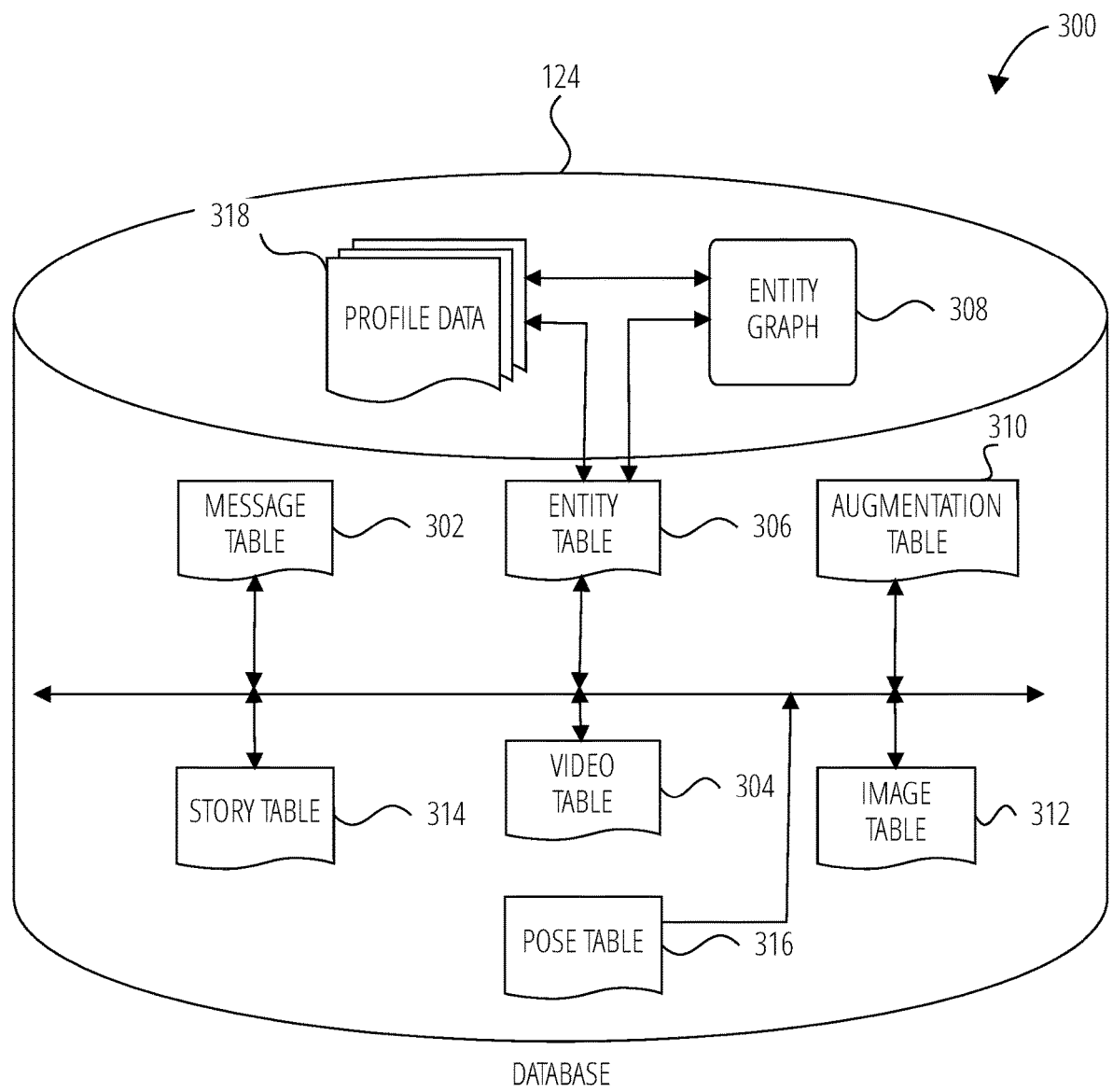
FIG. 3 is a diagrammatic representation of a data structure as maintained in a database, in accordance with some examples.

The social network server 120 supports various social networking functions and services and makes these functions and services available to the messaging server 114. To this end, the social network server 120 maintains and accesses an entity graph 308 (as shown in FIG. 3) within the database 124. Examples of functions and services supported by the social network server 120 include the identification of other users of the messaging system 100 with which a particular user has relationships or is "following," and also the identification of other entities and interests of a particular user.

The skeletal pose system 122 uses a person's movements to drive visual effects using augmented reality. For example, the skeletal pose system 122 receives a video of a human from an image capture device and identifies a pose. In response to identifying the pose, the skeletal pose system 122 applies a virtual effect to the video, in real-time.

System Architecture

Figure 2:
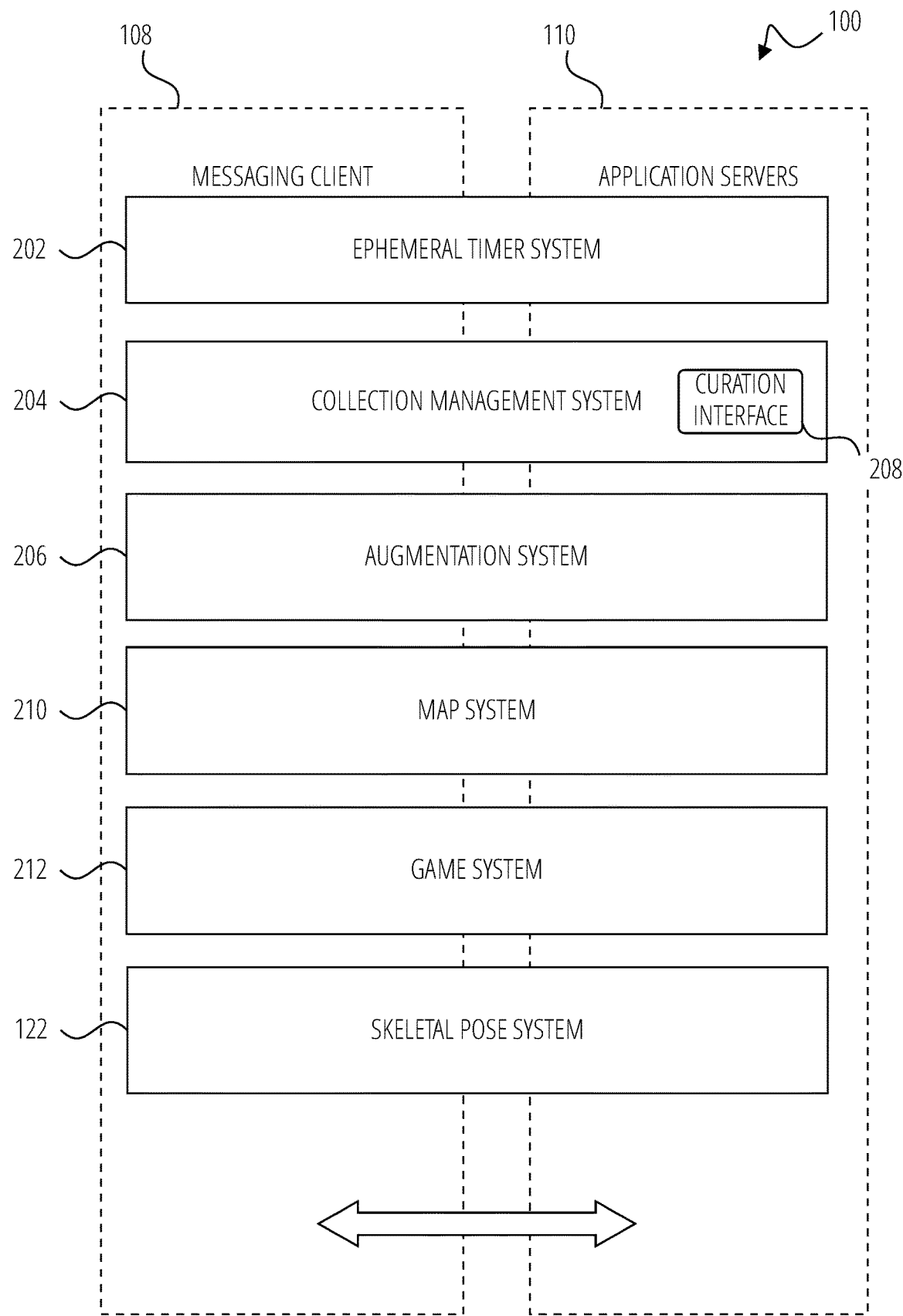
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, and a game system 212, and a skeletal pose system 122.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 124 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions and supports the presentation of map-based media content and messages by the messaging client 108. For example, the map system 210 enables the display of user icons or avatars (e.g., stored in profile data 318) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The skeletal pose system 122 uses a person's movements to drive visual effects using augmented reality. For example, the skeletal pose system 122 receives a video of a human from an image capture device and identifies a pose. In response to identifying the pose, the skeletal pose system 122 applies a virtual effect to the video, in real-time. In some examples, the skeletal pose system 122 operates within the context of the messaging client 108. In some examples, the skeletal pose system 122 may be supported by the application servers 110.

Data Architecture

FIG. 3 is a schematic diagram illustrating data structures 300, which may be stored in the database 124 of the messaging server system 104, according to certain examples. While the content of the database 124 is shown to comprise a number of tables, it will be appreciated that the data could be stored in other types of data structures (e.g., as an object-oriented database).

The database 124 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 306 stores entity data, and is linked (e.g., referentially) to an entity graph 308 and profile data 318. Entities for which records are maintained within the entity table 306 may include individuals, corporate entities, organizations, objects, places, events, and so forth. Regardless of entity type, any entity regarding which the messaging server system 104 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 318 stores multiple types of profile data about a particular entity. The profile data 318 may be selectively used and presented to other users of the messaging system 100, based on privacy settings specified by a particular entity. Where the entity is an individual, the profile data 318 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 108 to other users. The collection of avatar representations may include "status avatars," which present a graphical representation of a status or activity that the user may select to communicate at a particular time.

Where the entity is a group, the profile data 318 for the group may similarly include one or more avatar representations associated with the group, in addition to the group name, members, and various settings (e.g., notifications) for the relevant group.

The database 124 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 108 when the sending user is composing a message. Other types of filters include geolocation filters (also known as geo-filters), which may be presented to a sending user based on geographic location. For example, geolocation filters specific to a neighborhood or special location may be presented within a user interface by the messaging client 108, based on geolocation information determined by a Global Positioning System (GPS) unit of the client device 106.

Another type of filter is a data filter, which may be selectively presented to a sending user by the messaging client 108, based on other inputs or information gathered by the client device 106 during the message creation process. Examples of data filters include current temperature at a specific location, a current speed at which a sending user is traveling, battery life for a client device 106, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 106 and then displayed on a screen of the client device 106 with the modifications. This also includes modifications to stored content, such as video clips in a gallery that may be modified. For example, in a client device 106 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 106 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 106) and perform complex image manipulations locally on the client device 106 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 106.

In some examples, a computer animation model to transform image data can be used by a system where a user may capture an image or video stream of the user (e.g., a selfie) using a client device 106 having a neural network operating as part of a messaging client 108 operating on the client device 106. The transformation system operating within the messaging client 108 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 106 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 108 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 108, to contribute content to a particular live story. The live story may be identified to the user by the messaging client 108, based on his or her location. The end result is a "live story" told from a community perspective.

A further type of content collection is known as a "location story," which enables a user whose client device 106 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The database 124 can also store pose information in the pose table 316. The pose table 316 may be associated with various augmentations from the augmentation table 310.

Data Communications Architecture

Figure 4:
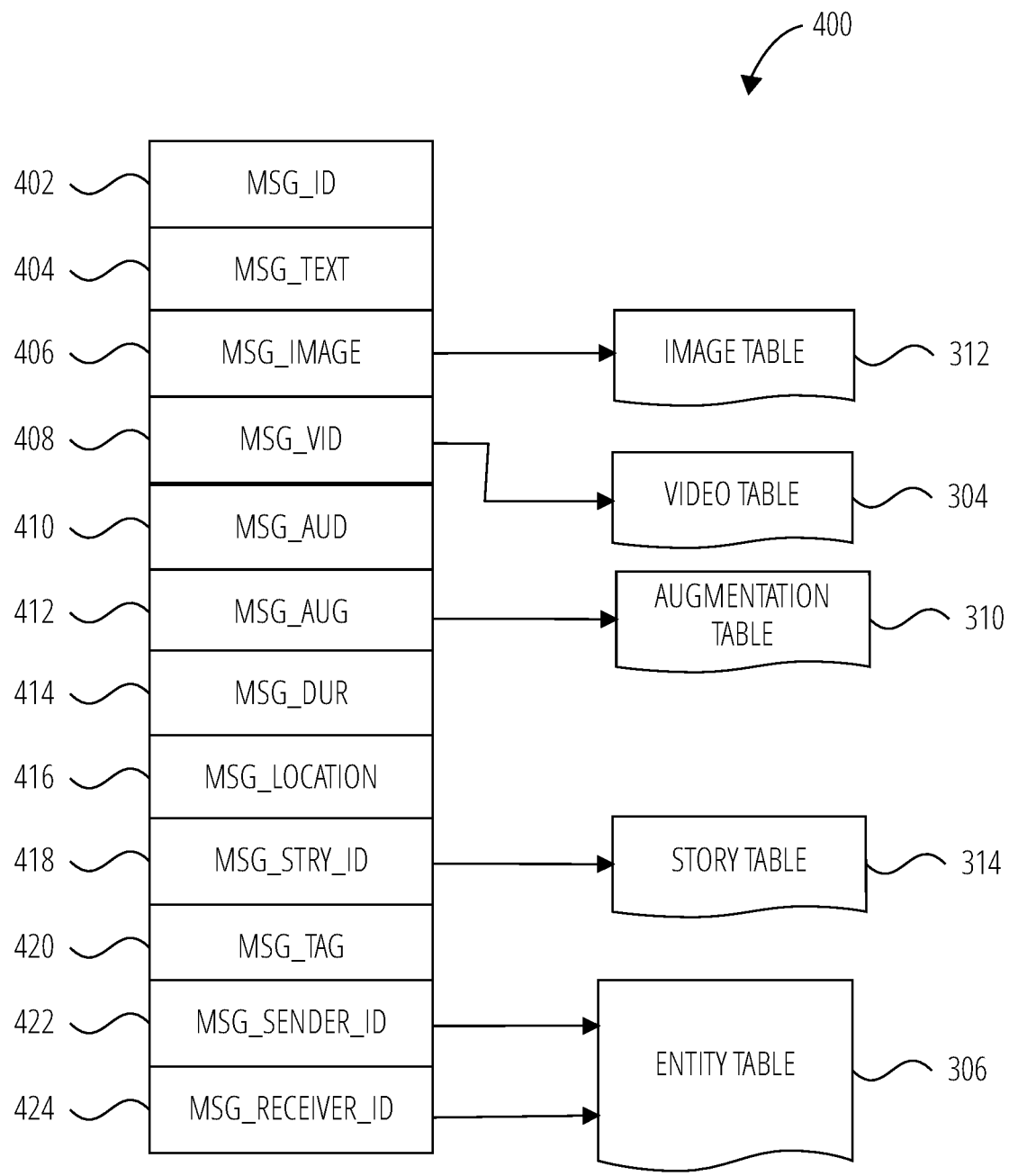
FIG. 4 is a diagrammatic representation of a message, in accordance with some examples.

FIG. 4 is a schematic diagram illustrating a structure of a message 400, according to some examples, generated by a messaging client 108 for communication to a further messaging client 108 or the messaging server 114. The content of a particular message 400 is used to populate the message table 302 stored within the database 124, accessible by the messaging server 114. Similarly, the content of a message 400 is stored in memory as "in-transit" or "in-flight" data of the client device 106 or the application servers 110. A message 400 is shown to include the following example components:

- message identifier 402: a unique identifier that identifies the message 400.
- message text payload 404: text, to be generated by a user via a user interface of the client device 106, and that is included in the message 400.
- message image payload 406: image data, captured by a camera component of a client device 106 or retrieved from a memory component of a client device 106, and that is included in the message 400. Image data for a sent or received message 400 may be stored in the image table 312.
- message video payload 408: video data, captured by a camera component or retrieved from a memory component of the client device 106, and that is included in the message 400. Video data for a sent or received message 400 may be stored in the video table 304.
- message audio payload 410: audio data, captured by a microphone or retrieved from a memory component of the client device 106, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 108.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 106 on which the message 400 was generated and from which the message 400 was sent.
- message receiver identifier 424: an identifier (e.g., a messaging system identifier, email address, or device identifier) indicative of a user of the client device 106 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
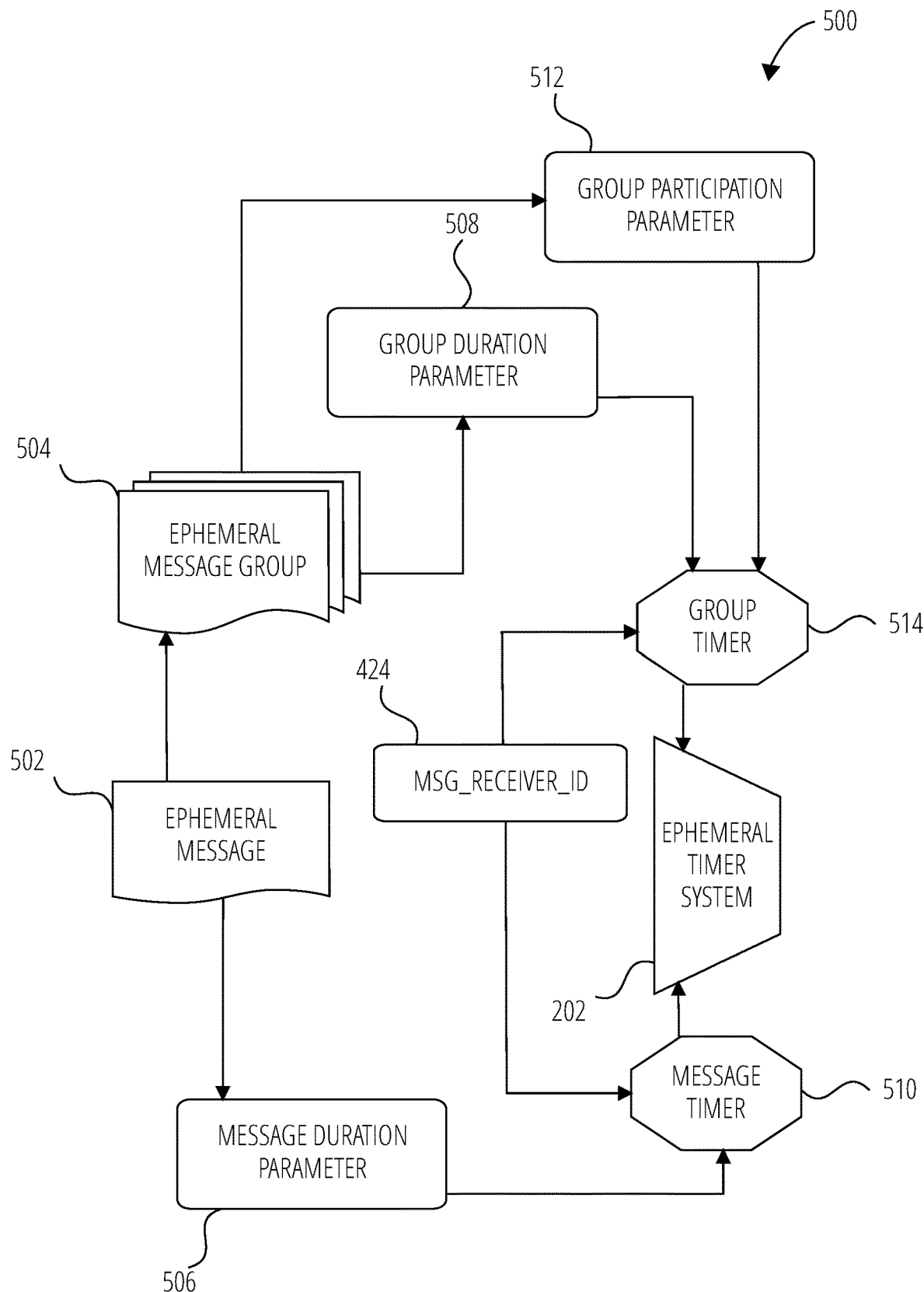
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 108. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 108) to cause an indicium (e.g., an icon) associated with the relevant ephemeral message group 504 to no longer be displayed within a user interface of the messaging client 108. Similarly, when the ephemeral timer system 202 determines that the message duration parameter 506 for a particular ephemeral message 502 has expired, the ephemeral timer system 202 causes the messaging client 108 to no longer display an indicium (e.g., an icon or textual identification) associated with the ephemeral message 502.

Figure 6:
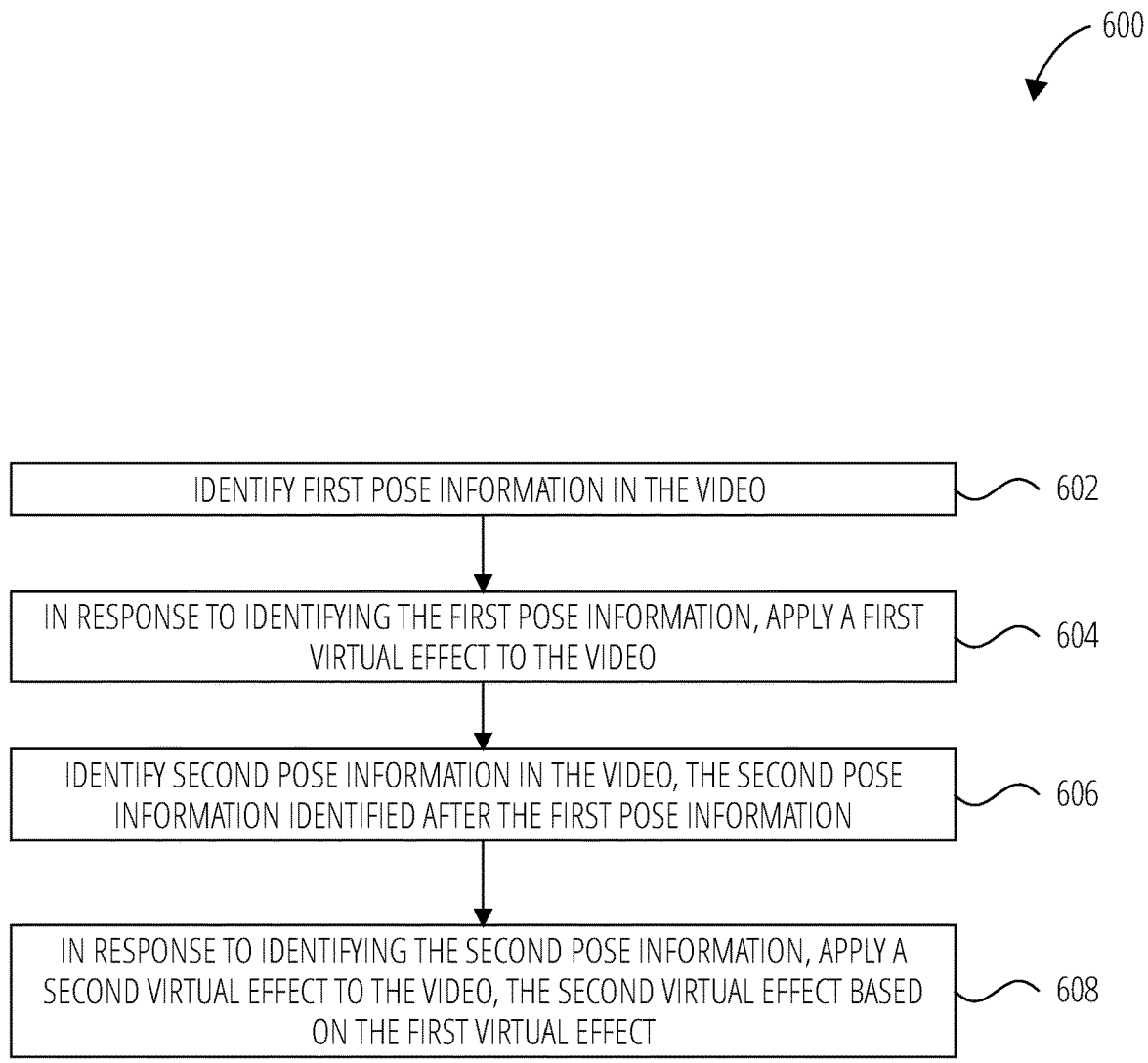
FIG. 6 is a flowchart of a method for capturing a video in real-time by an image capture device, according to some examples.

FIG. 6 is an example method for using human pose information to drive virtual effects in real-time. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, and so forth. The operations of methods may be performed in whole or in part, may be performed in conjunction with some or all of the operations in other methods, and may be performed by any number of different systems, such as the systems described herein, or any portion thereof, such as a processor included in any of the systems.

In operation 602, the skeletal pose system 122 identifies first pose information in a video during capture of the video by an image capture device. The first pose information includes a first plurality of joint locations of a human depicted in the video. It is understood that the first pose information may also include pose information of an animal, a face, or an animated creature or avatar, for example. At operation 604, in response to identifying the first pose information, the skeletal pose system 122 applies a first virtual effect to the video. The first virtual effect can be an augmented reality content item. Further details regarding the augmented reality content items can be found in connection with FIG. 3 described above. The first virtual effect is applied to the video in real-time or near real-time, while the video is being captured.

At operation 606, the skeletal pose system 122 identifies second pose information in the video. For example, the second pose information is a second plurality of joint locations of the human depicted in the video. The second pose information is different than the first pose information. Furthermore, the second pose information is identified at a point in time after the first pose information is identified. For example, the second pose information includes new joint locations of the human (e.g., the human has moved, or the human is performing a different pose). At operation 608, in response to identifying the second pose information, the skeletal pose system 122 applies a second virtual effect to the video. The second virtual effect can be a second augmented reality content item. The second virtual effect is based on the first virtual effect. For example, the second virtual effect can only be applied after the first visual effect. In some examples, the second virtual effect describes a lower level of granularity of the first visual effect. In another example, the second virtual effect enhances the first virtual effect. For example, the first virtual effect may add a color filter to the video during capture of the video. The second virtual effect may darken or lighten the color of the video applied by the first virtual effect based on the second pose information.

In some examples, the skeletal pose system 122 stores the modified video including the first visual effect and the second visual effect and transmits the video as an ephemeral message to a computing device. The modified video includes a first virtual effect that occurs at a first point in time of the video and the second virtual effect that occurs at a second point in time of the video.

In some examples, the skeletal pose system 122 identifies a hand in the video. The skeletal pose system 122 tracks the motion of the hand in the video from a first position to a second position and modifies a level of granularity of the first visual effect based on the tracked motion of the hand.

Figure 7:
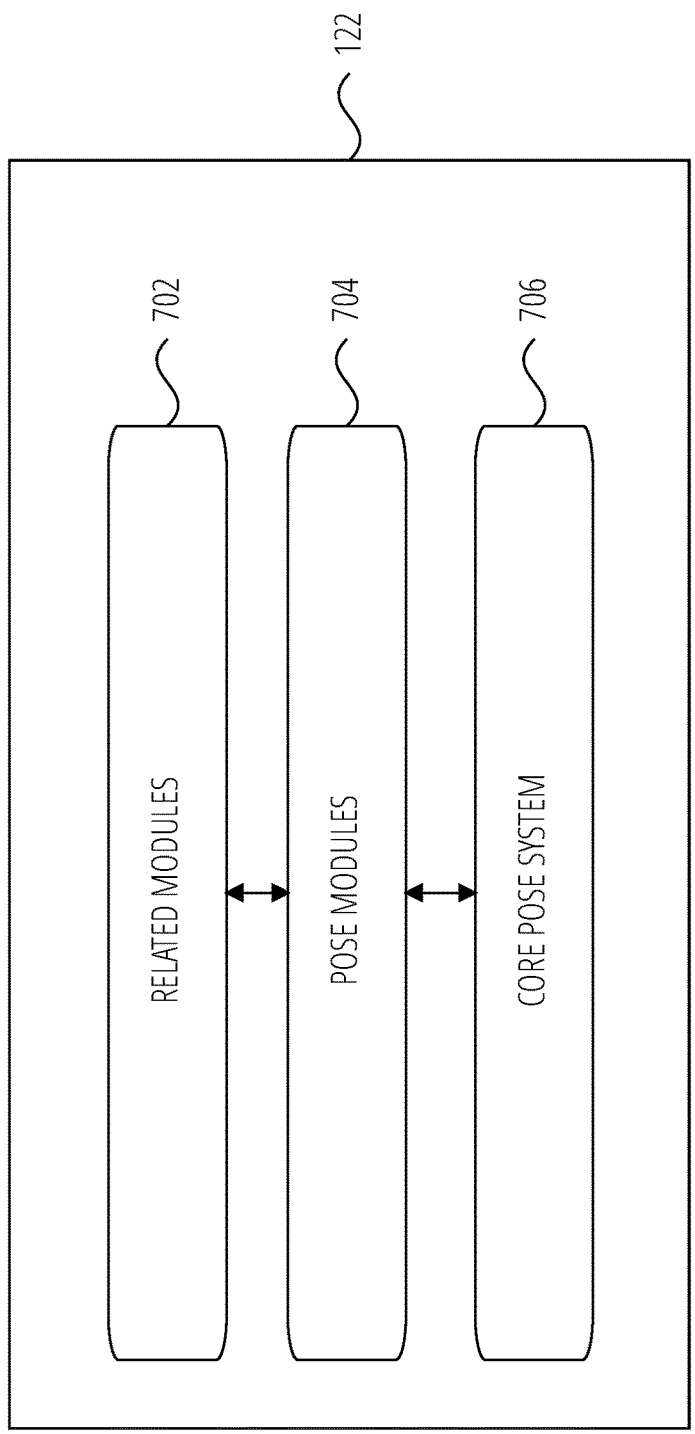
FIG. 7 is a diagrammatic representation of a skeletal pose system, according to some examples.

FIG. 7 is a diagrammatic representation of a skeletal pose system 122. The skeletal pose system 122 includes a core pose system 706, pose modules 1206 and related modules 1204. The core pose system 706 identifies various poses. For example, the core pose system 706 identifies the first pose information and the second pose information. After identifying a pose, the skeletal pose system 122 determines a virtual effect to apply to the video. For example, once a pose is identified, the skeletal pose system 122 accesses a pose module 704 that initiates a virtual effect and applies the virtual effect.

The pose modules 704 includes subsystems which contain a set of instructions to create different AR experiences. For example, a subsystem in the pose modules 704 may include a JavaScript file that creates an AR game experience. The related modules 702 can be used with the pose modules 704 and the skeletal pose system 122. In some examples the related module 702 can be used independently. The related modules 702 include instructions that describe various trigger events (e.g., user has opened their mouth, user swipes on the screen, etc.).

Figure 8:
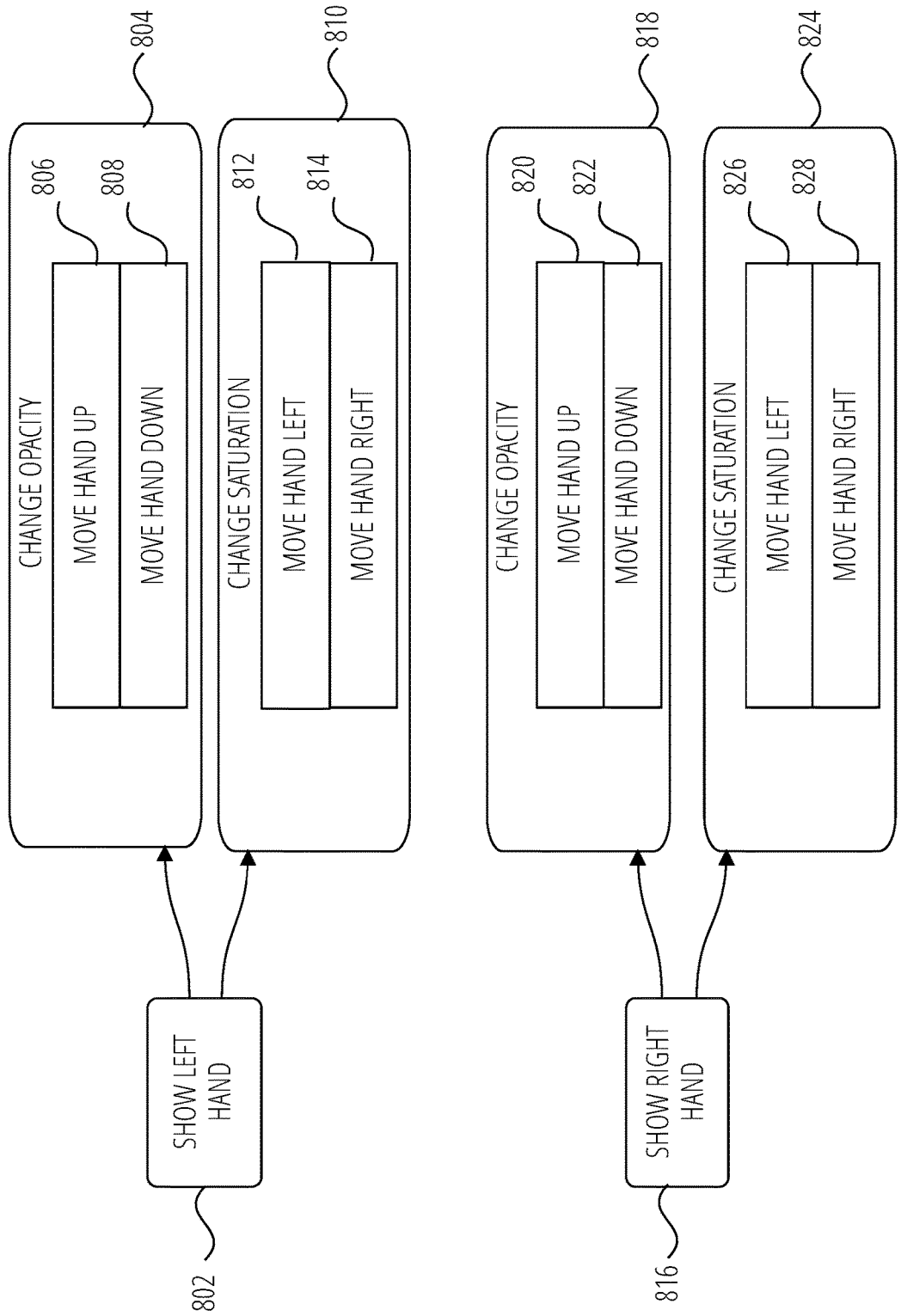
FIG. 8 is an example user behavior flow of a skeletal pose system, according to some examples.

FIG. 8 is an example user behavior flow of a skeletal pose system 122, according to some examples. For example, the skeletal pose system 122 identifies a left hand when the user shows their left hand (operation 802). If the user moves the hand up or down, the skeletal pose system 122 applies a virtual effect that changes the opacity (operation 804) of the video captured by the image capture device by increasing (e.g., based on detecting the user moves the hand up per operation 806) or decreasing the opacity (e.g., based on detecting the user moves the hand down per operation 808). If the user moves the hand left or right, the skeletal pose system 122 applies a virtual effect that changes the saturation (operation 810) levels in the video by increasing (e.g., based on detecting the hand moves right per operation 814) or decreasing (e.g., based on detecting the hand moves left per operation 812) the saturation. The skeletal pose system 122 identifies a right hand when the user shows their right hand (operation 816). Similarly, if the user moves the hand up or down, the skeletal pose system 122 applies a virtual effect that changes the opacity (operation 818) of the video captured by the image capture device by increasing the opacity (e.g., based on detecting the user moves their hand up per operation 820) or decreasing the opacity (e.g., based on detecting the user moves their down per operation 822). If the user moves the hand left or right, the skeletal pose system 122 applies a virtual effect that changes the saturation (operation 824) levels in the video by increasing the saturation (e.g., based on detecting the user moves their hand to the right per operation 828) or decreasing the saturation (e.g., based on detecting the user moves their hand to the left per operation 826).

Figure 9:
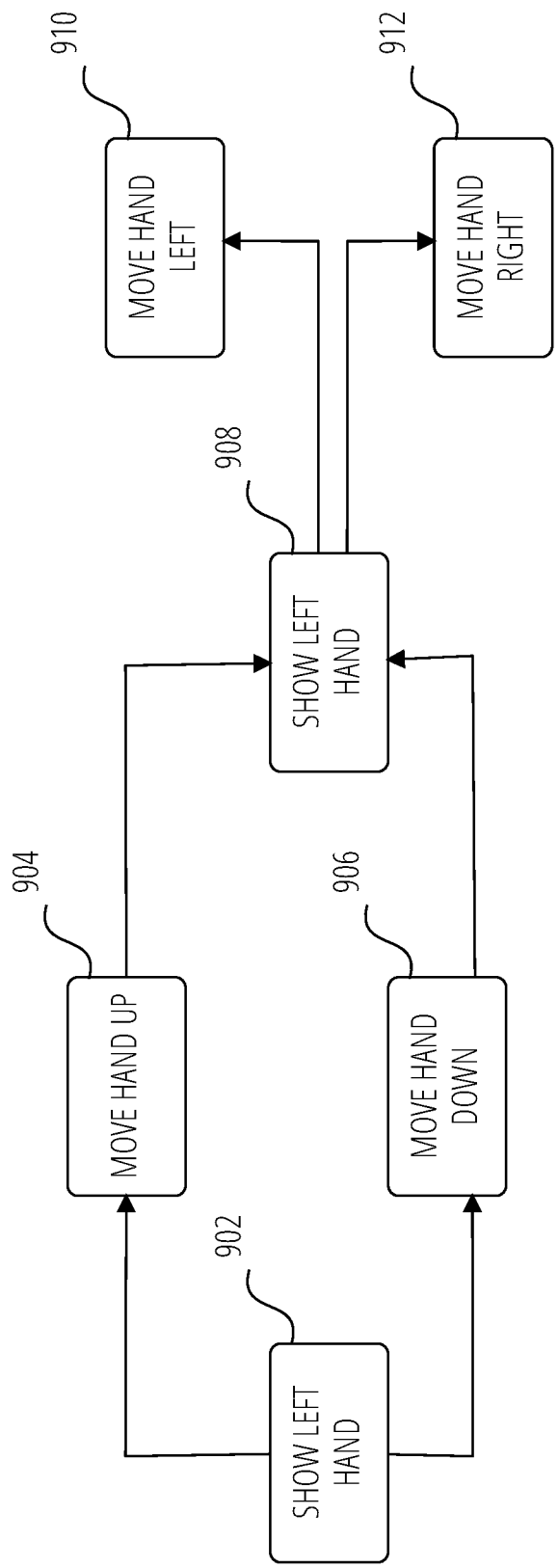
FIG. 9 is an example user behavior flow of a skeletal pose system, according to some examples.

FIG. 9 is an example of a user behavior flow of a skeletal pose system 122, according to some examples. First, at operation 902, the user shows her left hand. The user can move her hand up (operation 904) or down (operation 906) to change the opacity. For example, the user can move her hand up at operation 904 to increase the opacity. The user can then show her left hand again at operation 908 in a static position. This indicates to the skeletal pose system 122 that the user wants to maintain the increased opacity effect on the video. After showing her left hand again in a static position at operation 908, the user can move her hand left (operation 910) or right (operation 912) to change the saturation. Thus, the skeletal pose system 122 can use user movements to increase the opacity of the video and increase the saturation of the modified video.

Figure 10:
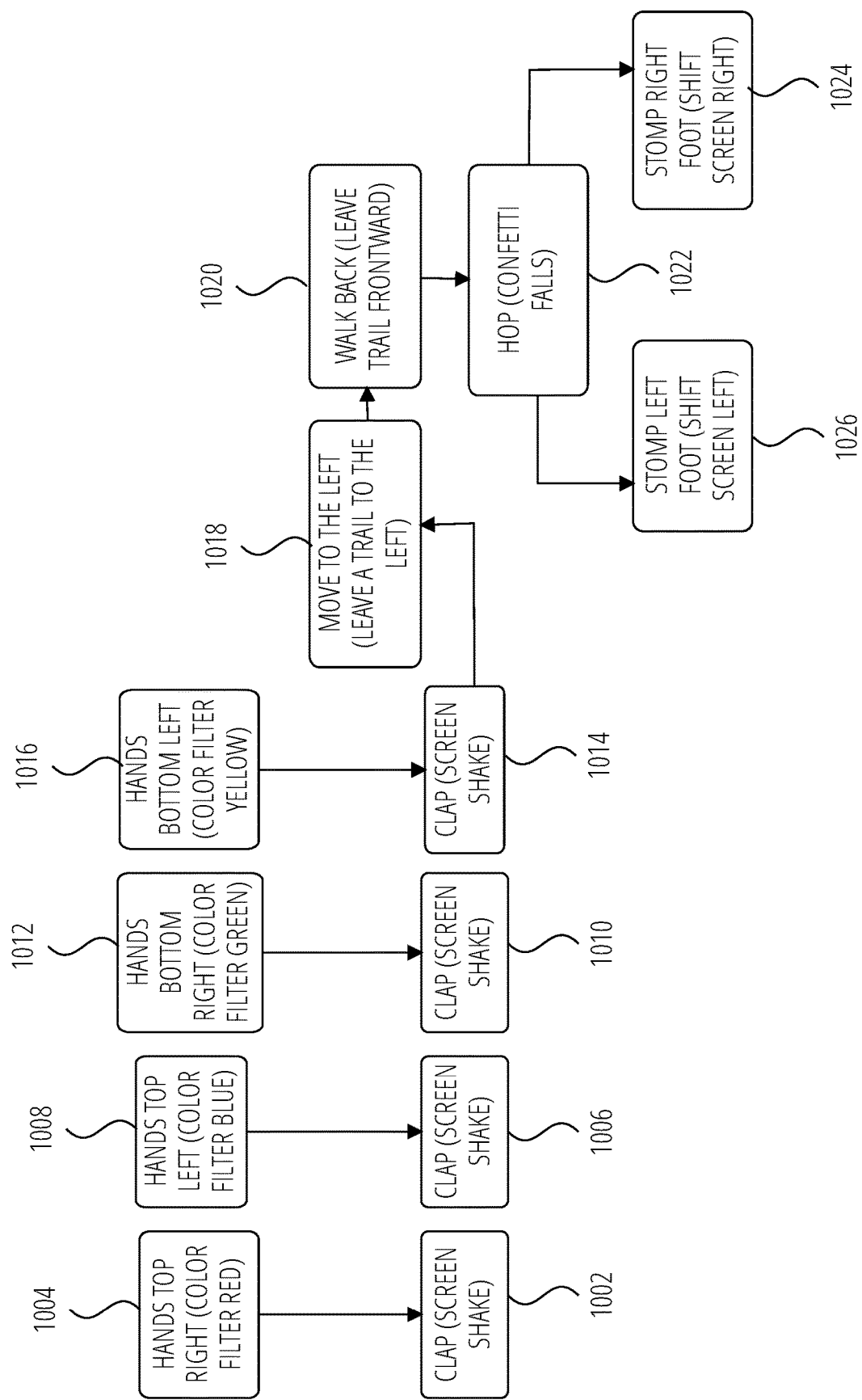
FIG. 10 is an example user behavior flow of a skeletal pose system, according to some examples.

FIG. 10 is an example of a user behavior flow in the skeletal pose system 122, according to some examples. For example, if a user claps their hands (operation 1002) in the top right of the camera view (e.g., top right portion in the camera view of the image capture device per operation 1004), the skeletal pose system 122 applies a "screen shake" and a red color filter on the video. For example, the screen shake effect adds blur and shakes the entire screen displayed within a graphical user interface of the image capture device. The screen shake and red color filter is applied by the skeletal pose system 122 in real-time, as the skeletal pose system 122 is capturing a video using an image capture device. If a user claps their hand for a second time (operation 906) to the top left of the camera view (operation 1008), the skeletal pose system 122 applies a "screen shake" effect and a blue color filter. If the user claps their hand for a third time (operation 1010) in the bottom right of the camera view operation (1012), the skeletal pose system 122 applies a green color filter and a "screen shake" effect. If the user claps their hand for a fourth time (operation 1014) to the bottom left of the camera view (operation 1016), the skeletal pose system 122 applies the "screen shake" effect and applies a yellow color filter to the video. If the user moves to the left of the camera view (operation 1018), the skeletal pose system 122 applies a virtual trail to the left of the camera view. If the user walks backwards (operation 1020) away from the camera (e.g., image capture device), the skeletal pose system 122 applies a virtual trail in front of the user. If the user jumps (operation 1022), the skeletal pose system 122 applies an augmented reality effect that causes virtual pieces of confetti to fall on the user. If the user stomps their left foot (operation 1026), the skeletal pose system 122 applies a screen shift effect that shifts the screen to the left. If the user stomps their right foot (operation 1024), the skeletal pose system 122 applies a screen shift effect that shifts the screen to the right. In some examples the user behavior flow in FIG. 10 may be initiated upon the skeletal pose system 122 identifying an audio cue. For example, the skeletal pose system 122 may initiate the user behavior flow described in FIG. 10 after identifying a specific song or a specific portion of a song. Thus, depending on the pose of the user, the skeletal pose system 122 applies a different virtual effect. In addition, the virtual effects that are applied are intuitive to the user's pose.

Figure 11:
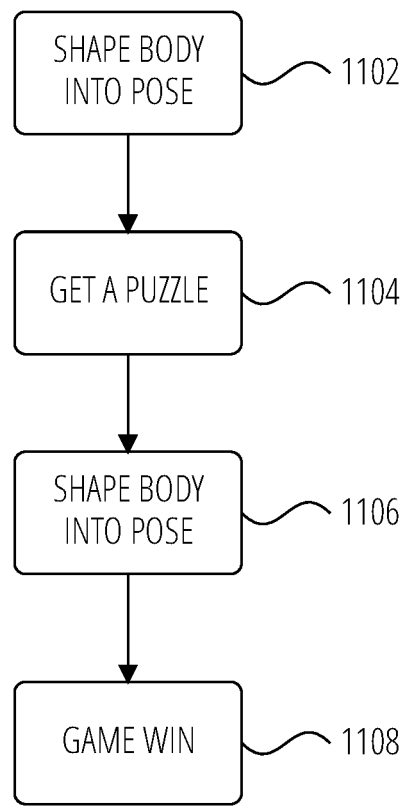
FIG. 11 is an example user behavior flow of a skeletal pose system, according to some examples.

FIG. 11 is an example of a user behavior flow in the skeletal pose system 122. The skeletal pose system 122 may be used in the context of gaming applications. For example, if the user successfully copies a first pose 1102 displayed on a graphical user interface of a client device, the skeletal pose system 122 generates a puzzle 1104. To solve the puzzle, the user may need to perform a second pose 1106. If the user successfully performs the second pose, the skeletal pose system 122 determines that the user has won the game 1108.

Figure 12:
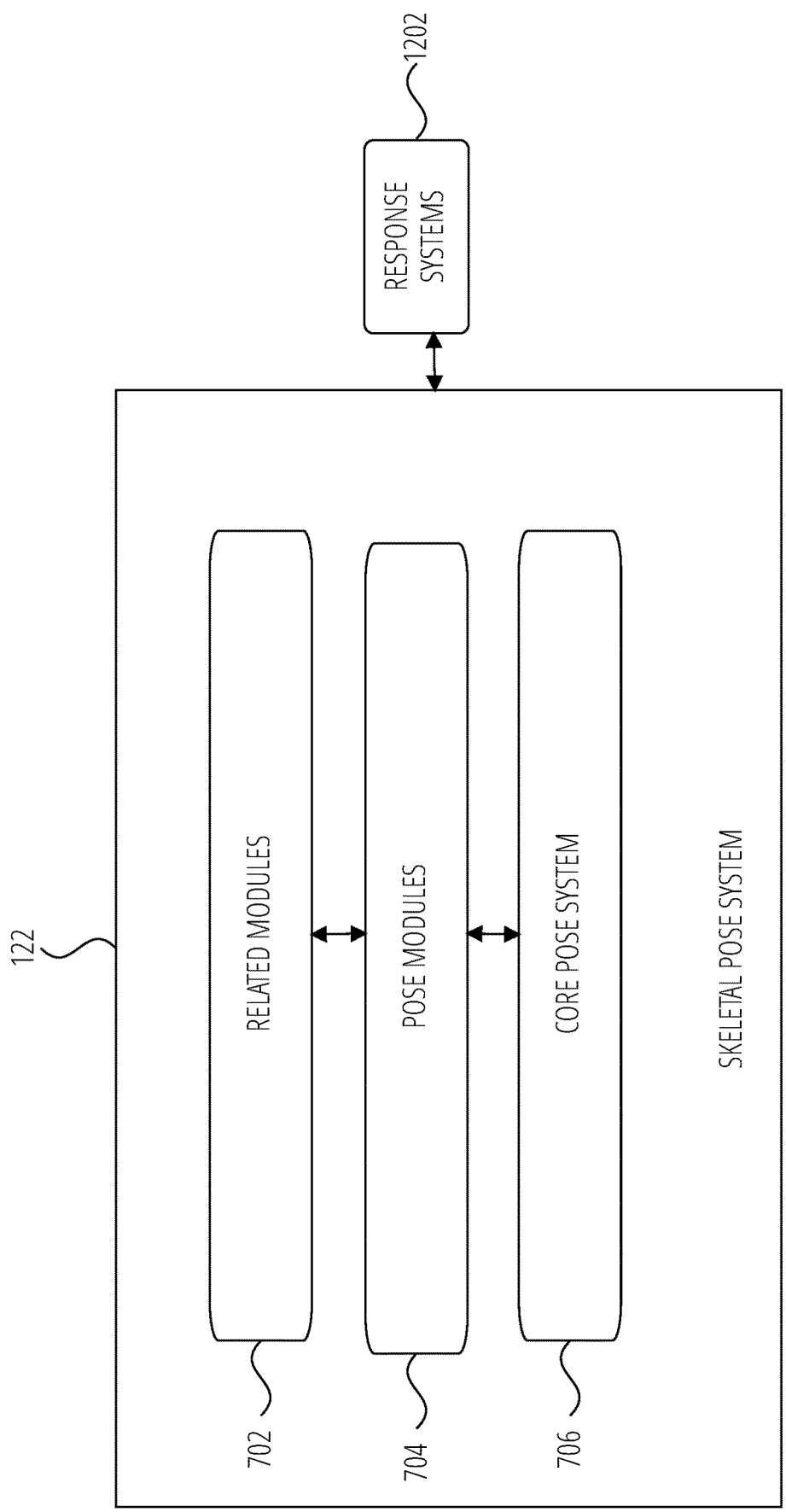
FIG. 12 is a diagrammatic representation of a skeletal pose system, according to some example embodiments.

FIG. 12 is a diagrammatic representation of a skeletal pose system 122, according to some example embodiments. The skeletal pose system 122 includes a core pose system 706, pose modules 704 and related modules 702. In some examples, the skeletal pose system 122 is communicatively coupled with a set of response systems 1202. The set of response systems 1202 includes one or more of a behavior system, a hint system and a multi-response system. While the skeletal pose system 122 is a collection of triggers designed to help a creator user (e.g., a user creating an AR effect) chain multiple AR effects based on the skeletal pose or gestures, the behavior system, hint system and multi-response system (collectively referred to as the response systems 1202) are a collection of responses which are designed to create the AR effects or assist users to chain multiple poses or gestures.

The behavior system is a single response system that links a trigger to a single response (e.g., a single AR effect). The multi-system response system links a trigger to a set of multi-responses. The hint system provides hints to the user to assist them in performing the poses or gestures needed to trigger one or more AR Effects.

Figure 13:
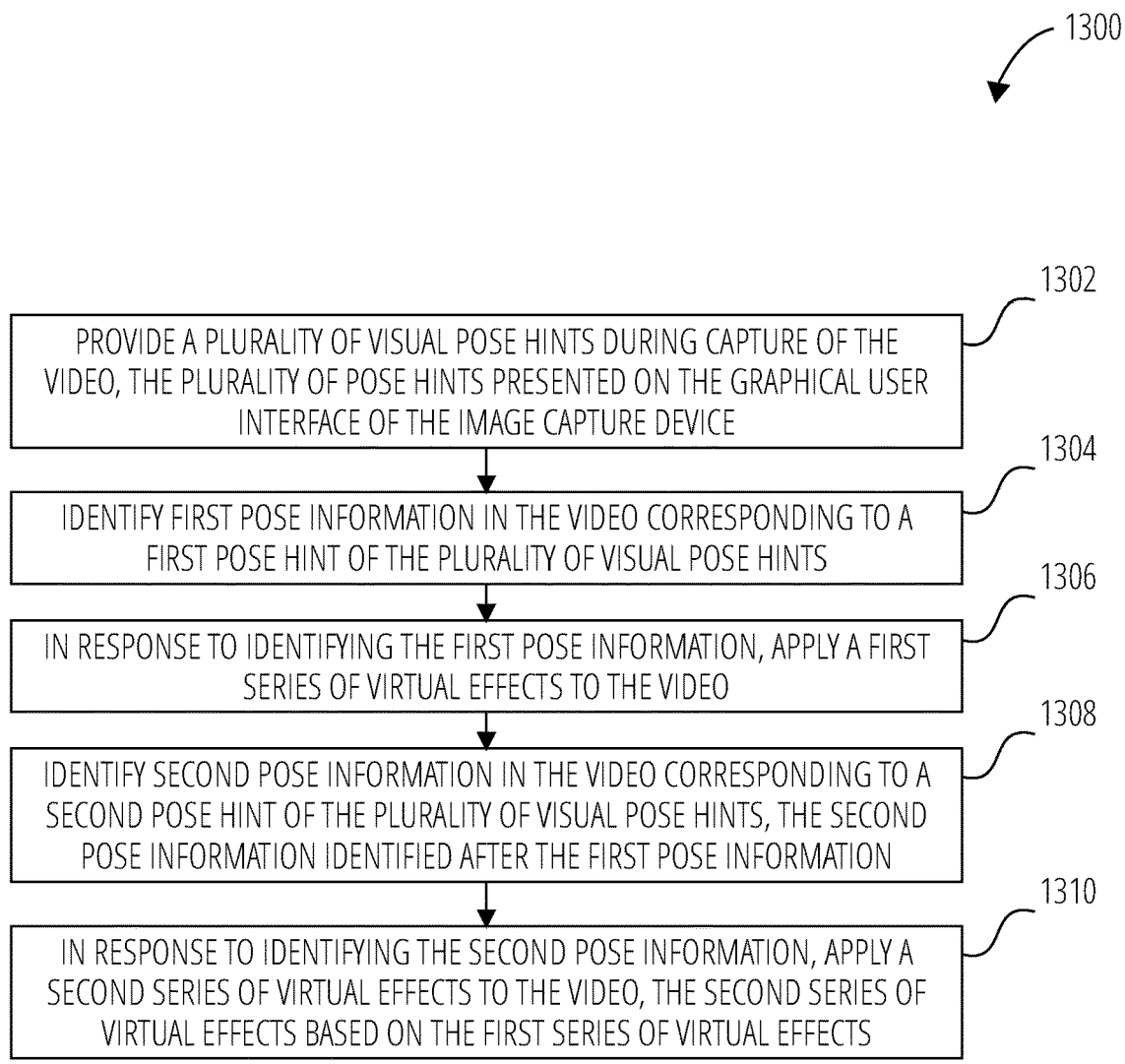
FIG. 13 is a flowchart of a method for capturing a video in real-time by an image capture device, according to some examples.
Figure 14:
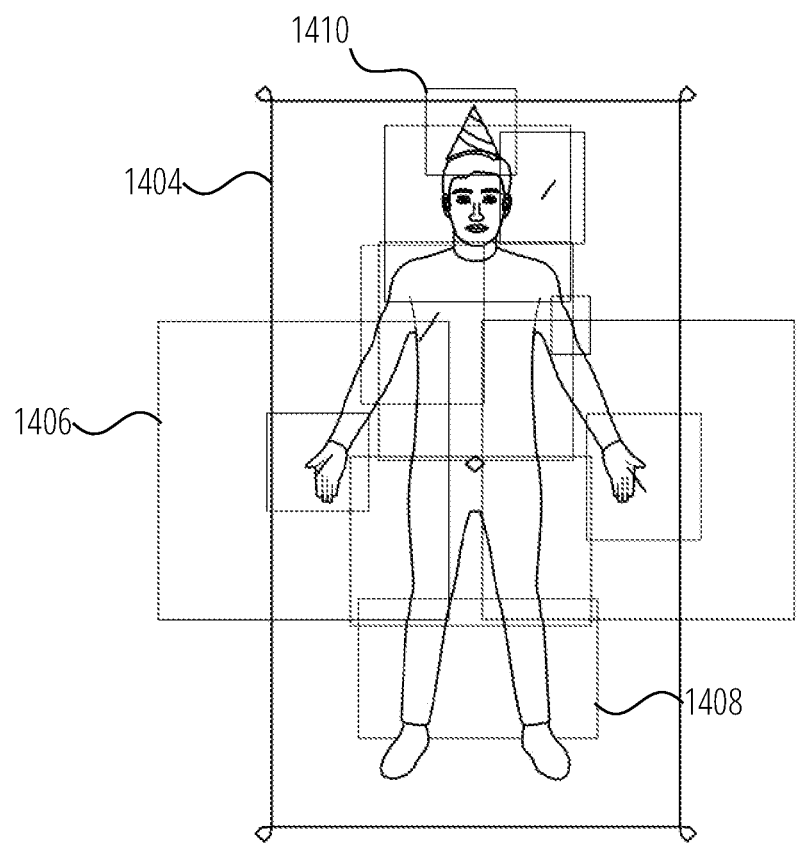

FIG. 13 is an example method for using human pose information to drive virtual effects in real-time. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, and so forth. The operations of methods may be performed in whole or in part, may be performed in conjunction with some or all of the operations in other methods, and may be performed by any number of different systems, such as the systems described herein, or any portion thereof, such as a processor included in any of the systems.

In operation 1302, the skeletal pose system 122 provides a plurality of visual pose hints during capture of the video, the plurality of pose hints presented on the graphical user interface of the image capture device. In operation 1304, the skeletal pose system 122 identifies first pose information in the video corresponding to a first pose hint of the plurality of visual pose hints. In operation 1306, the skeletal pose system 122 in response to identifying the first pose information, applies a first series of virtual effects to the video. In operation 1308, the skeletal pose system 122 identifies second pose information in the video corresponding to a second pose hint of the plurality of visual pose hints, the second pose information identified after the first pose information. In operation 1310, the skeletal pose system 122 in response to identifying the second pose information, applies a second series of virtual effects to the video, the second series of virtual effects based on the first series of virtual effects.

FIGS. 14-19 are example user interfaces of a skeletal pose system 122. The user interface in FIG. 14 may be displayed on a graphical user interface of a computing device of a creator user (e.g., a user who is creating AR effects driven by skeletal tracking). In one example, an AR effect is triggered if a user is moving their body to point to an area within the capture view of a camera. In another example, the AR effect is triggered based on the user's skeletal body pose or a gesture. A user may select regions of a body on the graphical user interface and apply various AR effects to those regions. For example, the user may select large regions (1404, 1406) or the user may select more defined regions (1408, 1410). The user may select the large regions and small regions using a selectable user interface element (e.g., button, checkbox, dropdown list) that is displayed on the graphical user interface.

Figure 15:
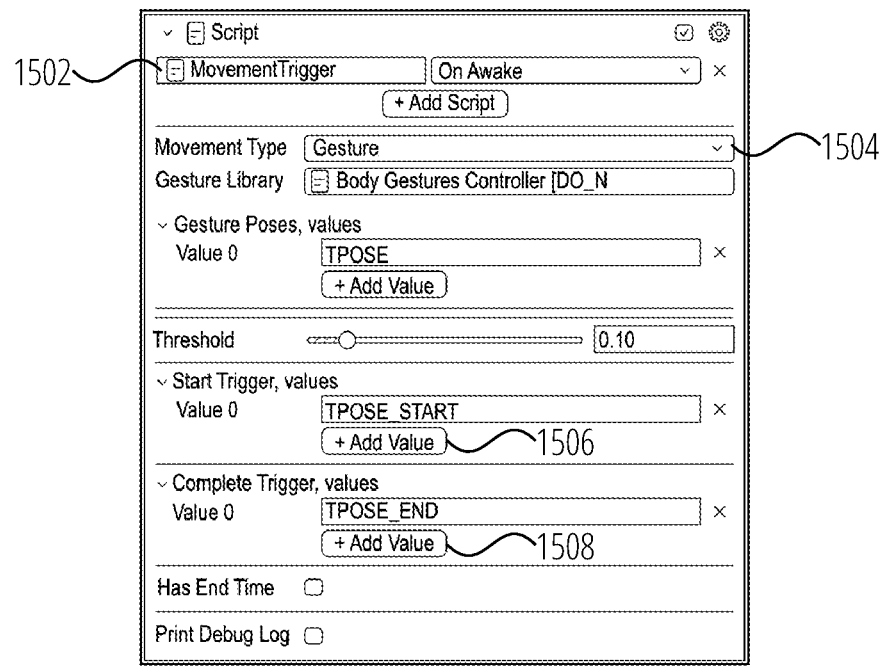

FIG. 15 is an example user interface displaying a script, according to some example embodiments. The script is provided by the skeletal pose system 122. For example, the script provides information about the skeleton of a human. In some examples, the script may be provided by the messaging server system 104. A user may select a first selectable user interface element (e.g., a button) 1502 to initiate a script for an AR trigger effect. The user may select a second selectable user interface element 1504 to set the trigger type. For example, as shown in, FIG. 15, the trigger is based on a gesture. The user may further select responses (1506, 1508) for the script. For example, user may select responses 1506 and 1508 to indicate when the trigger event should start and end, respectively.

In some examples, the user interface includes a threshold field which indicates how accurate the position or gesture needs to be in order for the AR effect to be triggered. In some examples, the user interface includes a trigger start and trigger end key words. The user interface may further include a toggle field which indicates whether the AR effect can be repeated. In some examples, the user interface includes a duration which indicates the length of time the AR effect should be applied to an image or video.

FIG. 16 is an illustration of how a gesture is defined, according to example embodiments. Item 1602 represents a body part and Item 1604 represents a location of the body part 1602. The image in FIG. 16 shows a series of numbers (e.g., 1602) that provide the relationship between relevant joints of the body (1602).

Figure 17:
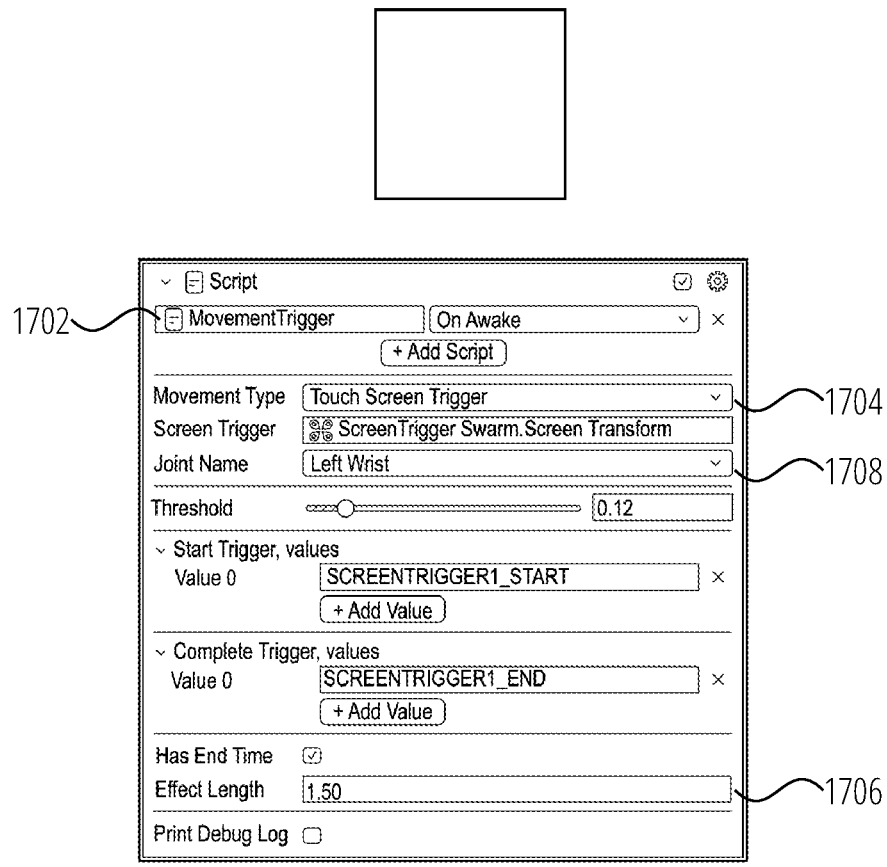

FIG. 17 is an example user interface displaying a script, according to example embodiments. In some examples, the user selects a first selectable user interface element 1702 to initiate a script for an AR trigger effect. The user may select a second selectable user interface element 1704 to set the trigger type. The user may select a third selectable user interface element 1708 to further define the trigger type. For example, in FIG. 17, the trigger event for the AR effect may require the left wrist to touch the screen. Additionally, the user may select a fourth selectable user interface element 1706 to add an effect length value so that the AR effect will end after some predetermined time.

Figure 18:
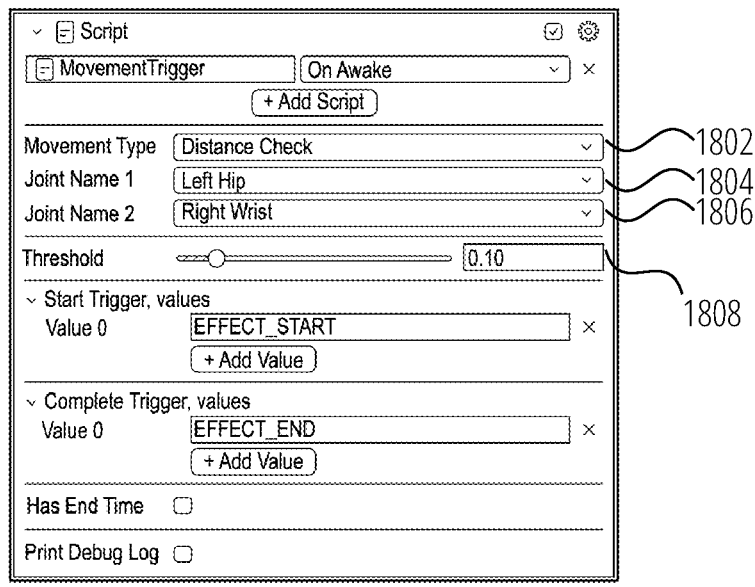

FIG. 18 is an example user interface displaying a script, according to example embodiments. In some examples, the AR effect may be triggered by how close two joints are (e.g., a user is dancing and puts their right wrist on their left wrist to trigger an AR effect). A user of the skeletal pose system 122 can configure this AR effect by using a first selectable user interface element 1802 to select the trigger type. The user can then select a selectable user interface representing a first joint 1804 and select a selectable user interface representing a second joint 1806. The user may further input a threshold value 1808 representing a distance between the two joints that is required to trigger the AR effect.

Figure 19:
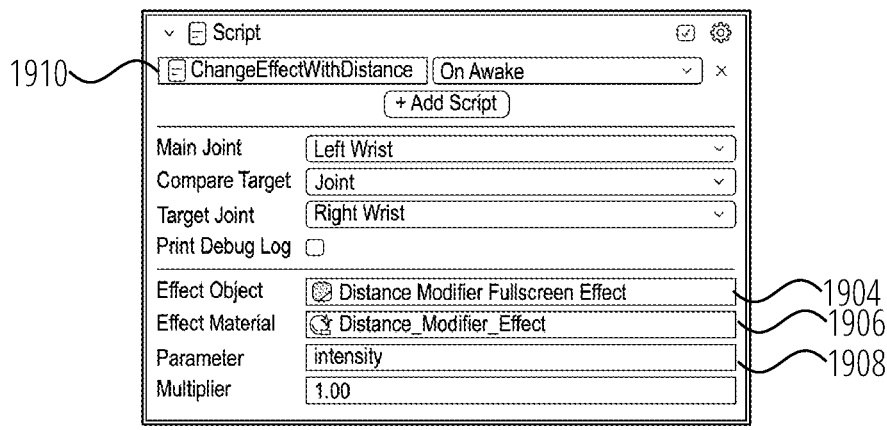

FIG. 19 is an example user interface displaying a script, according to example embodiments. In some examples the AR effects triggered by the skeletal pose system 122 can be continuous rather than discrete. For example the distance between the left wrist and right wrist of a user sets the opacity of an effect. A user may initiate a continuous effect by initiating a script using a selectable user interface 1910. The user may select user interface elements 1904, 1906, and 1908 to further customize the AR effect.

In some examples, the gestures and poses may be combined to create an example AR effect driven by skeletal pose tracking:
  a. 1. A user touches a virtual apple on the screen, and the virtual apple disappears, at the same time a cube is attached to the hand.
  b. 2. A user touches a virtual cherry on the screen, and the same thing happens to the other hand.
  c. 3. A user raises both hands up and color effects are applied to the screen.

Software Architecture

Figure 20:
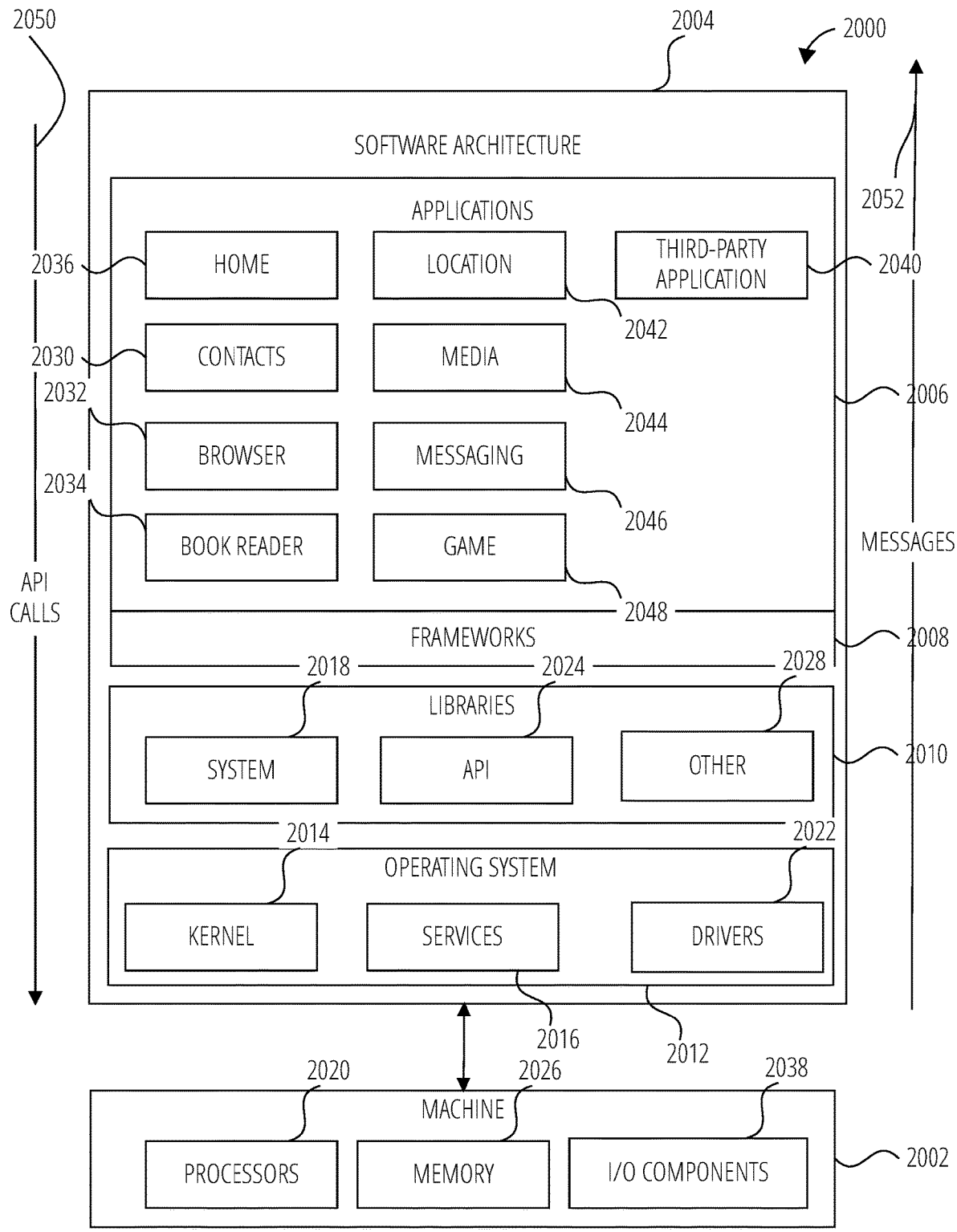
FIG. 20 is a block diagram showing a software architecture within which examples may be implemented.

FIG. 20 is a block diagram 2000 illustrating a software architecture 2004, which can be installed on any one or more of the devices described herein. The software architecture 2004 is supported by hardware such as a machine 2002 that includes processors 2020, memory 2026, and I/O components 2038. In this example, the software architecture 2004 can be conceptualized as a stack of layers, where each layer provides a particular functionality. The software architecture 2004 includes layers such as an operating system 2012, libraries 2010, frameworks 2008, and applications 2006. Operationally, the applications 2006 invoke API calls 2050 through the software stack and receive messages 2052 in response to the API calls 2050.

The operating system 2012 manages hardware resources and provides common services. The operating system 2012 includes, for example, a kernel 2014, services 2016, and drivers 2022. The kernel 2014 acts as an abstraction layer between the hardware and the other software layers. For example, the kernel 2014 provides memory management, processor management (e.g., scheduling), component management, networking, and security settings, among other functionality. The services 2016 can provide other common services for the other software layers. The drivers 2022 are responsible for controlling or interfacing with the underlying hardware. For instance, the drivers 2022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2010 provide a common low-level infrastructure used by the applications 2006. The libraries 2010 can include system libraries 2018 (e.g., C standard library) that provide functions such as memory allocation functions, string manipulation functions, mathematic functions, and the like. In addition, the libraries 2010 can include API libraries 2024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2010 can also include a wide variety of other libraries 2028 to provide many other APIs to the applications 2006.

The frameworks 2008 provide a common high-level infrastructure that is used by the applications 2006. For example, the frameworks 2008 provide various graphical user interface (GUI) functions, high-level resource management, and high-level location services. The frameworks 2008 can provide a broad spectrum of other APIs that can be used by the applications 2006, some of which may be specific to a particular operating system or platform.

In an example, the applications 2006 may include a home application 2036, a contacts application 2030, a browser application 2032, a book reader application 2034, a location application 2042, a media application 2044, a messaging application 2046, a game application 2048, and a broad assortment of other applications such as a third-party application 2040. The applications 2006 are programs that execute functions defined in the programs. Various programming languages can be employed to create one or more of the applications 2006, structured in a variety of manners, such as object-oriented programming languages (e.g., Objective-C, Java, or C++) or procedural programming languages (e.g., C or assembly language). In a specific example, the third-party application 2040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2040 can invoke the API calls 2050 provided by the operating system 2012 to facilitate functionality described herein.

Machine Architecture

Figure 21:
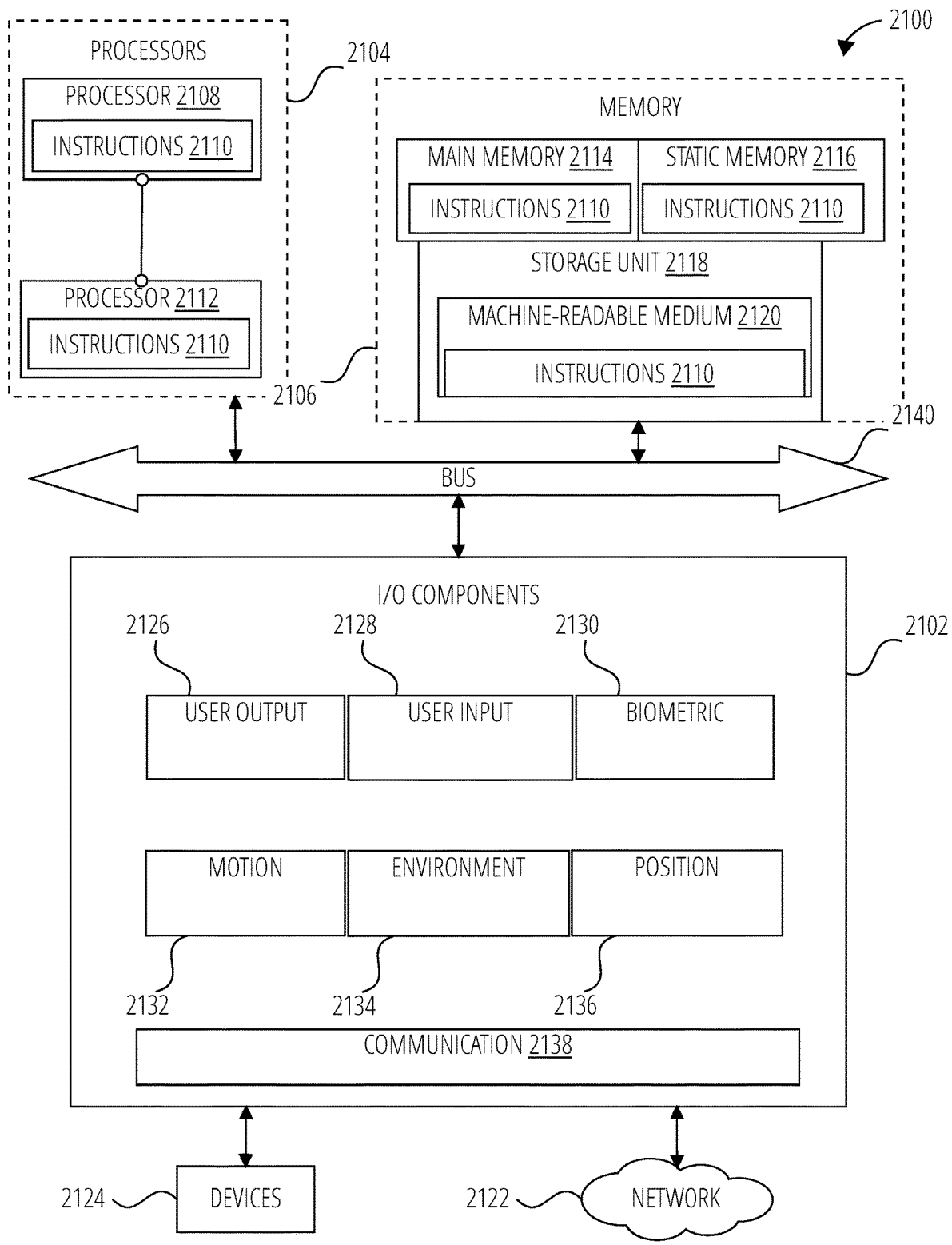
FIG. 21 is a diagrammatic representation of a machine in the form of a computer system within which a set of instructions may be executed for causing the machine to perform any one or more of the methodologies discussed herein, in accordance with some examples.

FIG. 21 is a diagrammatic representation of the machine 2100 within which instructions 2110 (e.g., software, a program, an application, an applet, an app, or other executable code) for causing the machine 2100 to perform any one or more of the methodologies discussed herein may be executed. For example, the instructions 2110 may cause the machine 2100 to execute any one or more of the methods described herein. The instructions 2110 transform the general, non-programmed machine 2100 into a particular machine 2100 programmed to carry out the described and illustrated functions in the manner described. The machine 2100 may operate as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2110, sequentially or otherwise, that specify actions to be taken by the machine 2100. Further, while only a single machine 2100 is illustrated, the term "machine" shall also be taken to include a collection of machines that individually or jointly execute the instructions 2110 to perform any one or more of the methodologies discussed herein. The machine 2100, for example, may comprise the client device 106 or any one of a number of server devices forming part of the messaging server system 104. In some examples, the machine 2100 may also comprise both client and server systems, with certain operations of a particular method or algorithm being performed on the server-side and with certain operations of the particular method or algorithm being performed on the client-side.

The machine 2100 may include processors 2104, memory 2106, and input/output I/O components 638, which may be configured to communicate with each other via a bus 2140. In an example, the processors 2104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2108 and a processor 2112 that execute the instructions 2110. The term "processor" is intended to include multi-core processors that may comprise two or more independent processors (sometimes referred to as "cores") that may execute instructions contemporaneously. Although FIG. 21 shows multiple processors 2104, the machine 2100 may include a single processor with a single-core, a single processor with multiple cores (e.g., a multi-core processor), multiple processors with a single core, multiple processors with multiples cores, or any combination thereof.

The memory 2106 includes a main memory 2114, a static memory 2116, and a storage unit 2118, both accessible to the processors 2104 via the bus 2140. The main memory 2106, the static memory 2116, and storage unit 2118 store the instructions 2110 embodying any one or more of the methodologies or functions described herein. The instructions 2110 may also reside, completely or partially, within the main memory 2114, within the static memory 2116, within machine-readable medium 2120 within the storage unit 2118, within at least one of the processors 2104 (e.g., within the Processor's cache memory), or any suitable combination thereof, during execution thereof by the machine 2100.

The I/O components 2102 may include a wide variety of components to receive input, provide output, produce output, transmit information, exchange information, capture measurements, and so on. The specific I/O components 2102 that are included in a particular machine will depend on the type of machine. For example, portable machines such as mobile phones may include a touch input device or other such input mechanisms, while a headless server machine will likely not include such a touch input device. It will be appreciated that the I/O components 2102 may include many other components that are not shown in FIG. 21. In various examples, the I/O components 2102 may include user output components 2126 and user input components 2128. The user output components 2126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2102 may include biometric components 2130, motion components 2132, environmental components 2134, or position components 2136, among a wide array of other components. For example, the biometric components 2130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2132 include acceleration sensor components (e.g., accelerometer), gravitation sensor components, rotation sensor components (e.g., gyroscope).

The environmental components 2134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 2136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2102 further include communication components 2138 operable to couple the machine 2100 to a network 2122 or devices 2124 via respective coupling or connections. For example, the communication components 2138 may include a network interface Component or another suitable device to interface with the network 2122. In further examples, the communication components 2138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2124 may be another machine or any of a wide variety of peripheral devices (e.g., a peripheral device coupled via a USB).

Moreover, the communication components 2138 may detect identifiers or include components operable to detect identifiers. For example, the communication components 2138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2138, such as location via Internet Protocol (IP) geolocation, location via Wi-Fi® signal triangulation, location via detecting an NFC beacon signal that may indicate a particular location, and so forth.

The various memories (e.g., main memory 2114, static memory 2116, and memory of the processors 2104) and storage unit 2118 may store one or more sets of instructions and data structures (e.g., software) embodying or used by any one or more of the methodologies or functions described herein. These instructions (e.g., the instructions 2110), when executed by processors 2104, cause various operations to implement the disclosed examples.

The instructions 2110 may be transmitted or received over the network 2122, using a transmission medium, via a network interface device (e.g., a network interface component included in the communication components 2138) and using any one of several well-known transfer protocols (e.g., hypertext transfer protocol (HTTP)). Similarly, the instructions 2110 may be transmitted or received using a transmission medium via a coupling (e.g., a peer-to-peer coupling) to the devices 2124.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   causing display of a skeletal pose tracking system on a graphical user interface of a computing device, the graphical user interface comprising an image of a human body;
   receiving, from the computing device, a selection of one or more regions of the human body;
   receiving augmented reality effect data for each of the one or more regions of the human body, the augmented reality effect data comprising a virtual effect, a trigger condition and an accuracy threshold; and
   causing modification of a video comprising a human user based on the received augmented reality effect data.

2. The method of claim 1, wherein the video comprises first pose information representing a first plurality of joint locations of the human user depicted in the video.

3. The method of claim 1, wherein the video comprises second pose information representing a second plurality of joint locations of the human user depicted in the video.

4. The method of claim 1, wherein the video comprises a first series of virtual effects comprising a plurality of first augmented reality content item.

5. The method of claim 4, wherein the plurality of first augmented reality content items is applied to the video in real-time during capture.

6. The method of claim 4, wherein the video comprises a second series of virtual effects comprising a plurality of second augmented reality content items.

7. The method of claim 6, further comprising:
   storing the video comprising the first series of virtual effects at a first time and the second series of virtual effects at a second time; and
   transmitting the video as an ephemeral message to a second computing device.

8. The method of claim 1, further comprising:
   identifying a hand in the video;
   tracking a motion of the hand from a first position to a second position; and
   modifying a level of granularity of the virtual effect based on the tracked motion of the hand.

9. A system comprising:

a processor; and a memory storing instructions that, when executed by the processor, configure the system to perform operations comprising:

causing display of a skeletal pose tracking system on a graphical user interface of a computing device, the graphical user interface comprising an image of a human body;

receiving, from the computing device, a selection of one or more regions of the human body;

receiving augmented reality effect data for each of the one or more regions of the human body, the augmented reality effect data comprising a virtual effect, a trigger condition and an accuracy threshold; and causing modification of a video comprising a human user based on the received augmented reality effect data.

10. The system of claim 9, wherein the video comprises first pose information representing a first plurality of joint locations of the human user depicted in the video.

11. The system of claim 9, wherein the video comprises second pose information representing a second plurality of joint locations of the human user depicted in the video.

12. The system of claim 9, wherein the video comprises a first series of virtual effects comprising a plurality of first augmented reality content item.

13. The system of claim 12, wherein the plurality of first augmented reality content items are applied to the video in real-time during capture.

14. The system of claim 12, wherein the video comprises a second series of virtual effects comprising a plurality of second augmented reality content items.

15. The system of claim 14, wherein the operations further comprise:

storing the video comprising the first series of virtual effects at a first time and the second series of virtual effects at a second time; and transmitting the video as an ephemeral message to a computing device.

16. The system of claim 9, further comprising:

identifying a hand in the video;

tracking a motion of the hand from a first position to a second position; and modifying a level of granularity of the virtual effect based on the tracked motion of the hand.

17. A non-transitory computer-readable storage medium, the computer-readable storage medium including instructions that when executed by a computer, cause the computer to perform operations comprising:

causing display of a skeletal pose tracking system on a graphical user interface of a computing device, the graphical user interface comprising an image of a human body;

receiving, from the computing device, a selection of one or more regions of the human body;

receiving augmented reality effect data for each of the one or more regions of the human body, the augmented reality effect data comprising a virtual effect, a trigger condition and an accuracy threshold; and causing modification of a video comprising a human user based on the received augmented reality effect data.

18. The computer-readable storage medium of claim 17, wherein the video comprises first pose information representing a first plurality of joint locations of the human user depicted in the video.

19. The computer-readable storage medium of claim 17, wherein the video comprises second pose information representing a second plurality of joint locations of the human user depicted in the video.

20. The computer-readable storage medium of claim 17, wherein the video comprises a first series of virtual effects comprising a plurality of first augmented reality content item.

* * * * *